United States Patent
Teng (10) Patent No.: US 9,597,756 B2
(45) Date of Patent: Mar. 21, 2017

(54) SYSTEM AND APPARATUS FOR SCREWS AUTOMATIC LOADING, DELIVERING, AND A SCREWDRIVER SET FOR FETCHING AND FASTENING SCREWS ON A TARGET

(75) Inventor: Jung-Ming Teng, Hsinchu (TW)

(73) Assignees: LITE-ON ELECTRONICS (GUANGZHOU) LIMITED, Guangzhou (CN); LITE-ON TECHNOLOGY CORP., Taipei (TW)

( * ) Notice: Subject to any disclaimer, the term of this patent is extended or adjusted under 35 U.S.C. 154(b) by 1354 days.

(21) Appl. No.: 13/465,459

(22) Filed: May 7, 2012

(65) Prior Publication Data

US 2013/0255451 A1    Oct. 3, 2013

(30) Foreign Application Priority Data

Mar. 31, 2012  (CN) .......................... 2012 1 0093041

(51) Int. Cl.
B23P 19/00        (2006.01)
B23P 19/06        (2006.01)
B25B 21/00        (2006.01)

(52) U.S. Cl.
CPC ............. *B23P 19/001* (2013.01); *B23P 19/06* (2013.01); *B23P 19/006* (2013.01); *B25B 21/00* (2013.01)

(58) Field of Classification Search
CPC ....... B23P 19/001; B23P 19/06; B23P 19/006; B25B 23/04; B25B 23/10; B25B 21/00
USPC ........ 81/57.35, 57.36, 57.37, 430, 431, 432, 81/433, 434, 435
See application file for complete search history.

(56) References Cited

U.S. PATENT DOCUMENTS

| | | | | |
|---|---|---|---|---|
| 3,305,155 A * | 2/1967 | Willis | ..................... | B25C 1/001 227/112 |
| 3,779,422 A * | 12/1973 | Mori | ................... | B65G 47/1478 198/398 |
| 3,875,982 A * | 4/1975 | Mizu | ...................... | B25B 23/04 221/10 |
| 3,986,540 A * | 10/1976 | Mori | ....................... | B25B 23/04 137/118.01 |
| 4,114,663 A * | 9/1978 | Viner | ...................... | B25B 23/04 221/263 |
| 4,694,974 A * | 9/1987 | Heck | ...................... | B23P 19/003 221/263 |
| 5,365,810 A * | 11/1994 | Inaniwa | .................. | B23P 19/06 81/430 |
| 5,400,838 A * | 3/1995 | Schjerven | ........... | A47J 37/1271 141/129 |
| 5,480,087 A * | 1/1996 | Young | ................... | B23P 19/003 221/268 |
| 5,515,752 A * | 5/1996 | Sawano | .................. | B23P 19/06 81/57.36 |
| 2003/0075023 A1* | 4/2003 | Robichaux | .............. | E21B 19/07 81/57.37 |

(Continued)

*Primary Examiner* — Larry E Waggle, Jr.
*Assistant Examiner* — Danny Hong
(74) *Attorney, Agent, or Firm* — McClure, Qualey & Rodack, LLP (57) ABSTRACT

A system for screws loading, delivering, fetching and fastening on a working piece is disclosed. The screws are guided by an apparatus having a control module to pass a track, a chute and received by a cut of a graduated disc having a plurality of cuts at the circumference thereof. A screwdriver set is then controlled by the control module to fetch the screws at the cuts in a fetching cycle and fasten them to a working piece.

5 Claims, 7 Drawing Sheets

(56) References Cited

U.S. PATENT DOCUMENTS

2011/0209589 A1* 9/2011 Ota ................. B23P 19/003
  81/430
2011/0252927 A1* 10/2011 Ota ................. B23P 19/005
  81/430

* cited by examiner

SYSTEM AND APPARATUS FOR SCREWS AUTOMATIC LOADING, DELIVERING, AND A SCREWDRIVER SET FOR FETCHING AND FASTENING SCREWS ON A TARGET

This application claims the benefit of People's Republic of China Application Serial No. 201210093041.0, filed Mar. 31, 2012, the subject matter of which is incorporated herein by reference.

FIELD OF THE INVENTION

The present invention pertains to a system for screws automatic loading, delivering, fetching from a graduated disc and fastening them on a working piece.

DESCRIPTION OF THE PRIOR ART

The popular trend without doubt for portable electric devices would be more and more light, slim, short and small. For instance, a slim mobile phone, ultra-book, ultra slim optical disk driver, mobile hard-disk and so on. These devices include a lower cover, an upper cover or a lid or a LCD display, a print circuit board and a battery. The ultra slim optical disk driver and mobile hard-disk further comprises driving and transporting members therein. These devices or members may be assembled, fixed or joint by clamps or hooks and the remaining members may require using small screws to fasten them. The small screws are too tiny to fasten them by manual operation since it is difficult and inefficiency to grab and fasten it. As a result the product design engineer would prefer to reduce the number of screws as possible and those of screws in necessity will be delivered by automatic assembly machine so as to cost down and shorten the yield cycle.

A conventional automatic machine is practiced by a container having a pile of screws therein with vibration so that any lucky screw dropped out from a guide outlet will be in the same direction. Thereafter, an electrical screwdriver or mechanical arm then fetches the screw and fastens it on a target. A drawback of this embodiment is the electrical screwdriver is able to grab one screw in each fetching cycle and most of time is wasted on to and fro process of the screwdriver. Hence it is inefficient.

A second conventional automatic machine is performed by gas blow pipe to achieve an aim of fetching screws. The gas blow pipe has an inlet connected with the outlet of the container and the outlet of the pipe is moving with a screwdriver. In the method, the lucky screws are in unique direction dropped into the gas blow pipe from the vibrating container. The pipe is carried to the destination and then an electrical screwdriver is ready at the outlet of the pipe to fetch the screw blown by a compressive air flow. The electrical screwdriver then fetches the screw and fastens it on the target. The method is capable of saving the time in comparison with the first conventional method since the screwdriver has saved a half of fetching cycle time. Therefore it is more efficient. However, the disadvantage of this method is constrained by the size of the screws. The ratio of the screw length L and a diameter of the screw head D must be over a threshold, otherwise, the screws in the pipe may turn around during blowing process so that the direction of screw out of the pipe is not unique, results in failure while fetching the screw.

Unfortunately, the screws generally used in slim mobile phones or ultra-book have low L/D ratio. As a result, the technique of gas blow pipe may be in vain.

An object of the present invention is to overcome the forgoing problems. The present invention is capable of fetching a plurality of screw each time without L/D ratio restriction.

SUMMARY OF THE INVENTION

An object of the present invention is to overcome random turning around problem of those tiny screws during delivering process by air blow pipe and the problem of one screw in one fetch cycle by the conventional automatic screw fastening system.

The present invention discloses a system for screws loading, delivering to a graduated disc and fetching them for assembling at the same time by a screwdriver set. No matter the screws are in a common size or a tiny size.

The system comprises a container for storing a pile of screws, a thin piece of track for transferring and moving those screws along the track down to the outlet of the track; a control module; a first detecting sensor right at the track outlet; a chute with a slide bar movable to and fro therein controlled by the control module; a gas blow pipe provided to blow any screw ready at the outlet to a first position in the chute; a base having a rotating axis driven by a step motor to rotate a graduated disc having a plurality of cuts at the circumference thereof; a second detecting sensor right at the outlet of the chute. The screw pushed by the slid bar will be retrieved by the cut and then the graduated disc turns away to let another cut right stopped at the outlet of the chute to receive next screw.

Preferably, the first and the second detecting sensors both comprise an optical fiber associated with a photo sensor to judge whether light output therefrom being masked by a reaching screw or not.

The apparatus further comprises a screwdriver set controlled by the control module so that the screwdriver set is capable of fetching a predetermined number of the screws at the cuts in a fetching cycle and then fastening the screws to the working piece.

The ways of fetching screws by the screwdriver set may include vacuum type and electromagnetic type. The type of vacuum absorption is preferred more.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

As aforementioned the known prior art in the background of the invention, the automatic fastening apparatus can only be called as semi-automation since it replaces only a part of manual operation. The screwdriver must be moved to the screw provided place for fetching a screw and then goes to the destination to fasten it and then returns back. The apparatus can process only one screw in each fetching cycle and most of time is wasted on the route of to and fro. It is inefficient.

The present invention provides a system having apparatus and a screwdriver set for screw loading, delivering, fetching and fastening automatically. The screwdriver set is capable of fetching a plurality of screws at the graduated disc in each cycle and fastening the screws into the working piece at the destination. Thus the method is very efficient.

Figure 1:
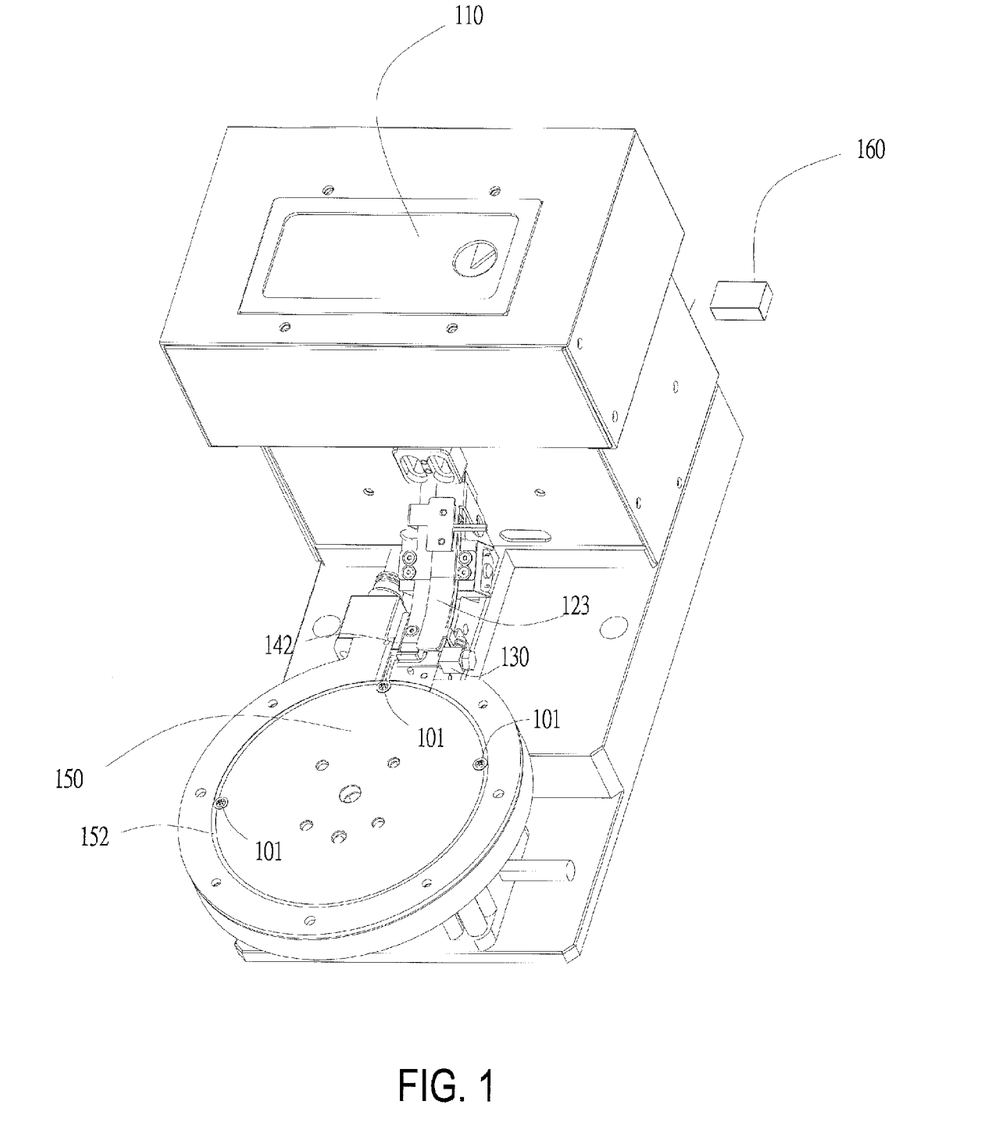
FIG. 1 shows a perspective view of a screw loading and delivering apparatus.
Figure 2A:
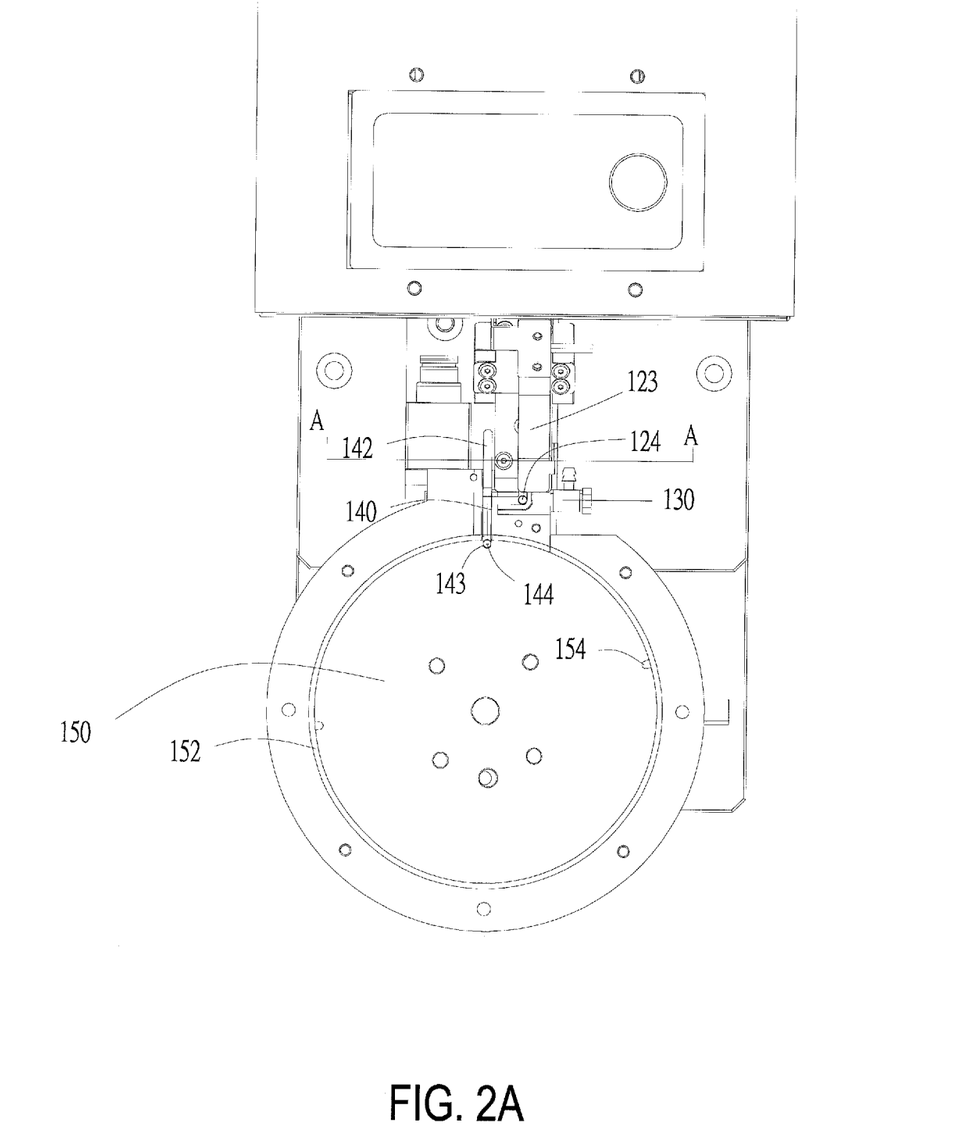
FIG. 2A shows a top-view of apparatus in FIG. 1.
Figure 2B:
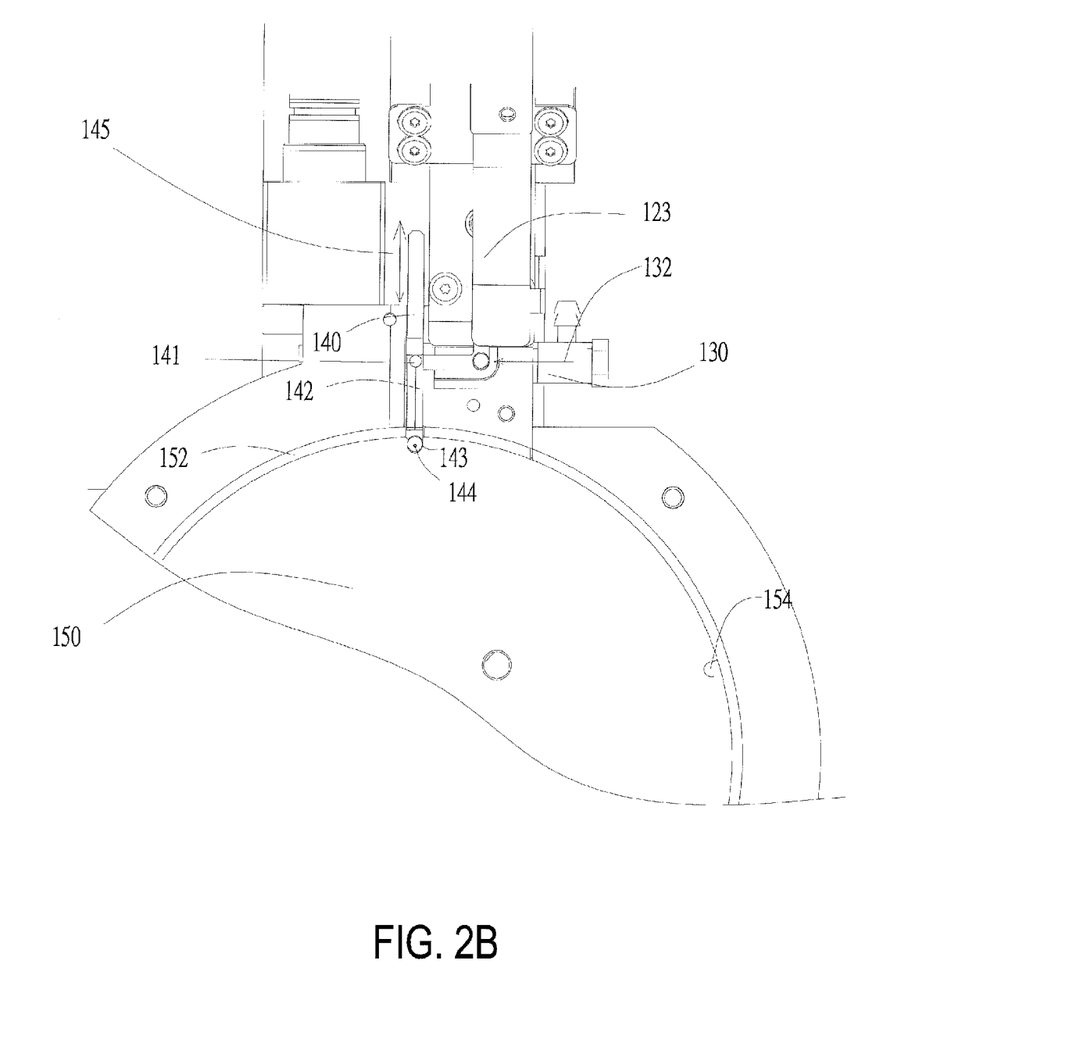
FIG. 2B shows an enlarge view of a local area of apparatus in FIG. 2A.
Figure 3:
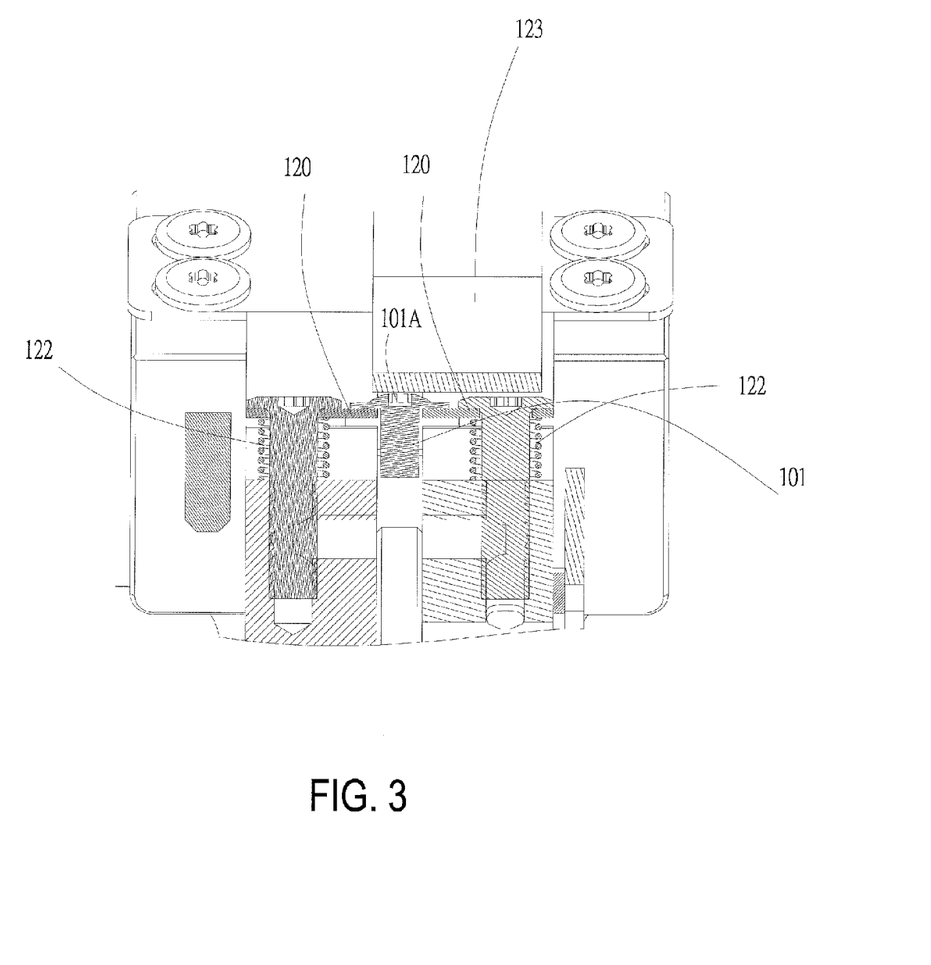
FIG. 3 shows an enlarge view of FIG. 2A along the cut line A-A.
Figure 4:
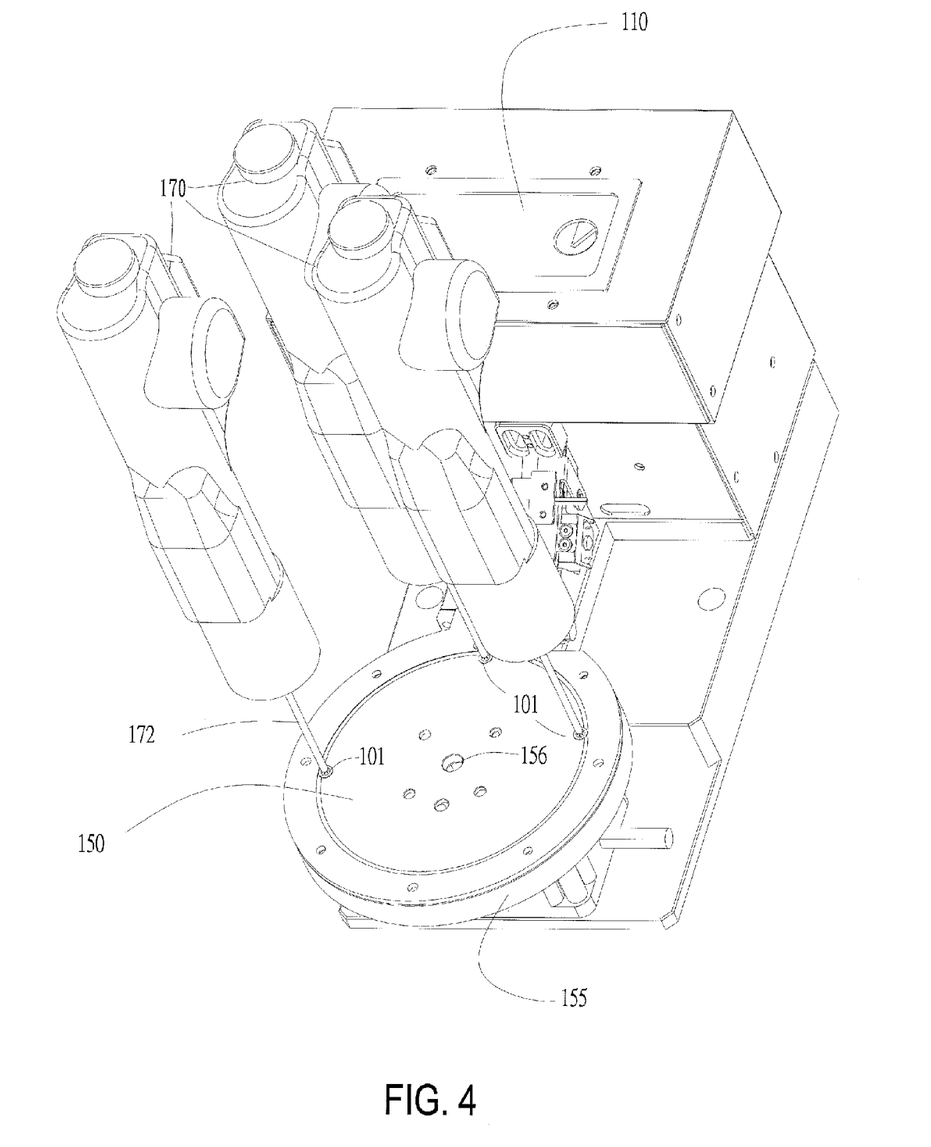
FIG. 4 shows a perspective view of a system of apparatus for screws automatic loading, delivering and further a screwdriver set for fetching and fastening.

FIG. 1 illustrates a perspective view of apparatus for screw loading, and delivering. FIG. 2A is a top view of the apparatus shown in FIG. 1. FIG. 2B is an enlarge view of a local area of apparatus shown in FIG. 2A. FIG. 3 is a cross-sectional view along a line A-A in FIG. 2A. FIG. 4 shows a perspective view of apparatus for screw loading, delivering and further including a screwdriver set for fetching the screws. Please refer to FIGS. 1 to 4, the apparatus includes a container 110, a thin piece of track 120, a gas blow pipe 130, a chute 140, a slid bar 142, a graduated disc 150, a control module 160, and a screwdriver set 170. Furthermore, a first detecting sensor 124 is installed at and beneath an outlet of the track 120 and a second detecting sensor 144 is set under an outlet of the chute 140. The control module 160 has a control program and one or more control unit(s) to control turning angles of the graduated disc 150, a valve (not shown) for a compressive air flux of the air blow pipe 130, the moving of the slide bar 142, and the displacement and turning angles of screwdriver set 170.

Figure 5:
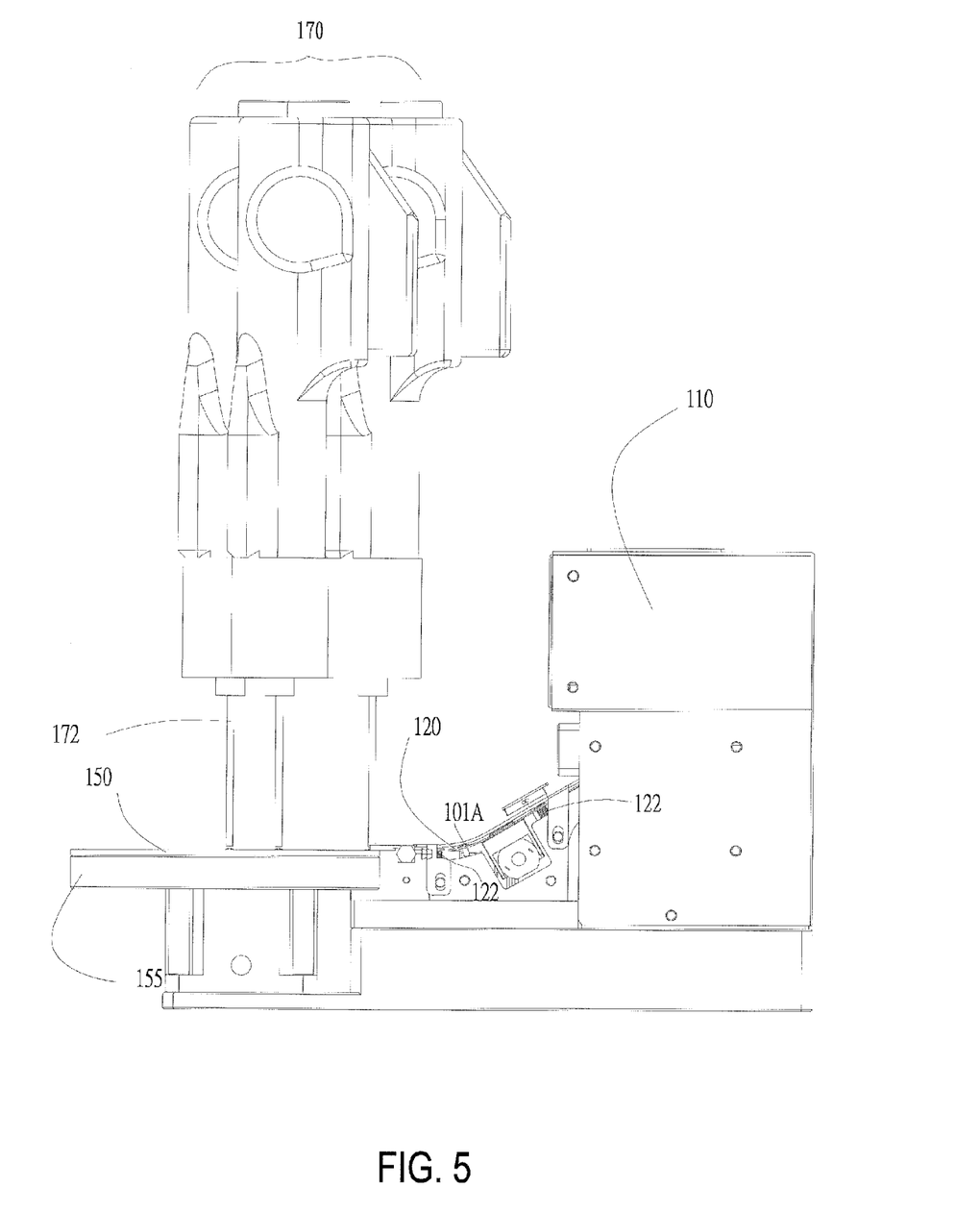
FIG. 5 show a side-view of the apparatus and the screwdriver set in FIGS. 4.

Firstly, a pile of screws 101 in the container 110 are agitated or vibrated so that the screws are dropped and guided one after another into the bevel track 120. The track 120 includes a slit having a width just allowing the screw shaft to pass but not the screw head 101A so that the screws 101 sliding along the bevel track 120 will not turn around and reach the outlet of the track 120 in a predetermined direction. Since the track 120 is assembled by thin piece of plates and supported by elastic member such as springs 122 to provide vibration, as the cross-sectional view shown in FIG. 3 and a side view in FIG. 5, so that screws 101 are moving on and along the track 120 without jamming. In a preferred embodiment, the springs 122 are preferred to have a natural oscillation frequency compatible with the moving rate of the screws 101. Aside from that, the track 120 has an upper cover 123 to prevent the screws 101 from being out of track before reaching the outlet.

Please refer to FIG. 2B, when the screw 101 slides down to the outlet of the track 120, the first detecting sensor 124 detects the screw 101 is ready and then prompts the air blow pipe 130 outputting a compressive air flow, as shown with an arrow 132. The air flow pushes the screw 101 to the first ready position 141 in the chute 140, a slide bar 142 then further pushes the screw 101 to the second ready position 143, which is an outlet of the chute 140 and a cut 154 of the graduated disc 150 is standby right at there in advance so as to retrieve the screw 101.

Figure 6:
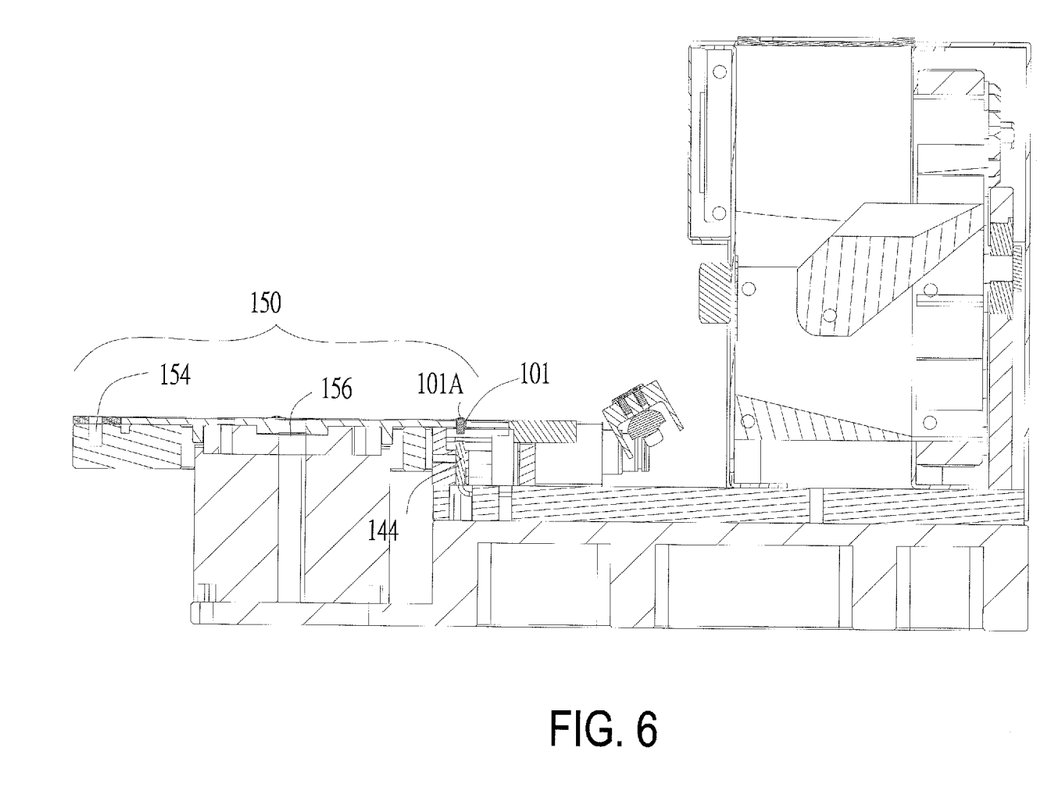
FIG. 6 shows a graduated disc, a base, and two detecting sensors.

The graduated disc 150 is set up on a rotating axis 156 driven by a motor (not shown) of the base 155. The circumference of the graduated disc 150 has a plurality of semi-circle cuts 154 formed to clamp the screw head 101A. FIG. 6 is cross-sectional view showing the graduated disc 150, base 155 and the second detecting sensor 144.

In addition, the base 155 has a circle groove 152 formed therein. The position of the circle groove 152 corresponds to a circle sketched along the centers of the cuts 154 so that the screws shaft clamped by the cuts 154 are in the circle groove 152 while the graduated disc 150 turns about the rotating axis 156. Worthwhile, the outlet of the chute 140 has the second detecting sensor 144 so that a cut 154 of the graduated disc 150 will be stopped there after each turn. If a screw 101 is detected by the second detecting sensor 144, the graduated disc 150 will be turned an angle so as to take the screw 101 away the outlet of the chute 140 and let another cut 154 to retrieve another screw.

As forgoing depictions, engaging with the circle groove 152, the cuts 154 of the graduated disc 150 will retrieve the screws in turn waiting for fetching by the screwdrivers 172 of the screwdriver set 170 in a fetching cycle.

Preferably, the first and the second detecting sensors 124, 144, both comprise an optical fiber associated with a photo sensor to judge whether light output therefrom being masked by a reaching screw or not.

The displacement quantity including horizontal and vertical and/or rotating angles of the screwdrivers 172 of the screwdriver set 170 is controlled by the control module 160 so that the screwdriver set 170 can fetch those screws at the cuts 154 and then moves to the working piece (not shown) and fastening them in one fetching cycle. The screws 101 fetched by the screwdrivers 172 may be absorbed in a vacuum way or an electromagnetic way. The vacuum absorption is found to be the best mode and the electromagnetic absorption is the second preferred.

In a preferred embodiment, there are many factors such as the pitches among the semicircle cuts 154, the number of the cuts 154, and the diameters of the graduated disc 150 associated with that of circle groove 152 designed in according with the conditions of the working piece so that the screwdrivers 172 are capable of moving with the least displacement and/or turning angle to transfer the screws 101 to the destination. The conditions include the screw holes, numbers, and positions thereof. Therefore, the graduated disc may change with the batch of the working pieces.

In another preferred embodiment, the screwdriver set 170 may fetch the screws 101 after some of the cuts 154 are filled rather than all of predetermined semicircle cuts 154 of the graduated disc 150 are filled.

In the next embodiment, the screwdrivers 172 are capable of fetching the screws by groups. Some of the screws are grouped in a group I and the others are grouped in a group II.

In the next preferred embodiment, there are two group of cuts and cuts in the group I is just for the batch I of working pieces so that those of cuts grouped in the group II will not be filled with any screws 101 until the working time is just for the batch II of working pieces. The control programming can be run by software controlled by the control module 160. The object of this strategy is to save the replacing time and the number of graduated disc 150 prepared.

The benefits of the present invention are as follows:
1. The bevel track is capable of ensuring any screws on the track keeping a predetermined direction at the outlet of the track.
2. Due to the vibration of the thin piece of bevel track supported by springs, the screws moving along the track will not be jammed each other.
3. Since a detecting sensor is installed at the outlet of the track to monitor any ready screw and the other sensor is at the outlet of the chute so that there is enough time to provide the graduated disc taking away the screw. The chute provides buffer time for turning the graduated disc.

4. The detecting sensor installed at the outlet of the chute provides the cut to be precisely stopped at the outlet of the chute while turning the graduated disc and further provides the control module easier to adjust the turning time of the graduated disc precisely.

5. The cuts of the graduated disc associated with the circle groove provide the screwdriver set fetching more than one screw in one time.

Though the time of the screws clamped by the cuts and the circle groove is in different time but they are all fetched by the screwdriver set at the same time and then moved to the destination to fasten them in one time. The process is efficient and the time is saved.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A screw loading and delivering apparatus comprising:
    a container for containing screws;
    a bevel track for transporting screws from an outlet of said container to an outlet of said track;
    a control module;
    a first detecting sensor for detecting whether a screw is ready at said outlet of said track;
    a chute having a slide bar moving along said chute;
    a gas blow pipe to blow any screw right at said outlet of said track to a first position in said chute, and said screw is pushed to a second position in said chute by said slide bar;
    a second detecting sensor for detecting whether the screw is at said second position; and
    a graduated disc seated on a base and capably of rotating with a programming turning angle about a rotating axis controlled by said control module, wherein said graduated disc has a plurality of cuts formed and distributed at a circumference of said graduated disc for receiving the screw at said second position.

2. The screw loading and delivering apparatus according to claim 1, wherein said first and second detecting sensors both comprise an optical fiber and a photo sensor to determine whether the light outputted from said optical fibers being masked by the screw or not.

3. The screw loading and delivering apparatus according to claim 1, wherein said control module has control units to control a valve of said gas blow pipe, a moving of said slide bar, and said programming control after the light is masked out by the screw.

4. The screw loading and delivering apparatus according to claim 1, wherein said bevel track is supported by an elastic member to make said track vibrated so as to prevent screws at said track from jamming.

5. The screw loading and delivering apparatus according to claim 1, further comprising a circle groove formed around said circumference of said base so that the screws clamped at said cuts moving along said circle groove would not be dropped out while said graduated disc is turning.

* * * * *